US010652186B1

(12) United States Patent
Mesters et al.

(10) Patent No.: US 10,652,186 B1
(45) Date of Patent: May 12, 2020

(54) ASSOCIATING ELECTRONIC MESSAGES RELATED TO THE SHARING OF A FILE

(71) Applicant: Amazon Technologies, Inc., Seattle, WA (US)

(72) Inventors: Floor Mesters, The Hague (NL); Ivo van Doorn, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 775 days.

(21) Appl. No.: 14/625,011

(22) Filed: Feb. 18, 2015

(51) Int. Cl.
*H04L 12/58* (2006.01)

(52) U.S. Cl.
CPC .............. *H04L 51/16* (2013.01); *H04L 51/22* (2013.01)

(58) Field of Classification Search
CPC ...................................................... H04L 51/16
See application file for complete search history.

(56) References Cited

U.S. PATENT DOCUMENTS

| | | | | |
|---|---|---|---|---|
| 2012/0110092 A1* | 5/2012 | Keohane | ............. | G06Q 10/107 709/206 |
| 2012/0278405 A1* | 11/2012 | Costenaro | ............... | H04L 51/08 709/206 |
| 2014/0172987 A1* | 6/2014 | Luu | ......... | H04L 51/16 709/206 |
| 2014/0280602 A1* | 9/2014 | Quatrano | ................ | H04W 4/08 709/205 |
| 2014/0372446 A1* | 12/2014 | Bell | ..................... | G06Q 10/107 707/740 |

OTHER PUBLICATIONS

Starting a PDF Review, by Adobe Acrobat Nov. 24, 2014.*

* cited by examiner

*Primary Examiner* — Philip J Chea
*Assistant Examiner* — Ishrat Rashid
(74) *Attorney, Agent, or Firm* — Lee & Hayes, P.C.

(57) ABSTRACT

Functionality is disclosed for informing users of feedback provided that is related to a shared file. In some configurations, a sharing service utilizes a message identifier to associate subsequent electronic messages related to the shared file with a first electronic message. Instead of electronic messages being displayed in different threads, the electronic messages related to the sharing of the file with a same group of users may be included within a same message thread. For example, a sharing service may include the message identifier within a message header of a subsequent sharing message such that a message client identifies the received sharing message as part of the same message thread as previous electronic messages relating to the sharing of the file. The sharing service may create a sharing message associated with an initial sharing message in response to receiving feedback for a file that is shared by the sharing service.

20 Claims, 12 Drawing Sheets

ASSOCIATING ELECTRONIC MESSAGES RELATED TO THE SHARING OF A FILE

BACKGROUND

Many businesses and users depend on electronic mail ("email") for communication. These different users may rely on email to send messages and share files. A user might receive between twenty-five and two hundred emails a day and send between ten and eighty emails a day. In some cases, the user will add attachments to the emails before sending to another user. Some of these attachments may be relatively small in size (e.g., less than 1 MB) whereas other attachments may be relatively large (e.g., greater than 5 MB).

Managing all of this data can be very challenging both for the user and for the businesses. In the case of the user, controlling who has access to an attachment can be difficult and time consuming. For example, a user might encrypt emails or password protect attachments intended for particular recipients. Businesses, on the other hand, may be attempting to manage all of this data and the email service on their own premises ("on-premise"). For example, a business may deploy servers on-premise to provide the email service. Providing an on-promise email service, however, can be costly, not only due to upkeep of the computers but also in administrators to manage the email service.

DETAILED DESCRIPTION

Figure 1:
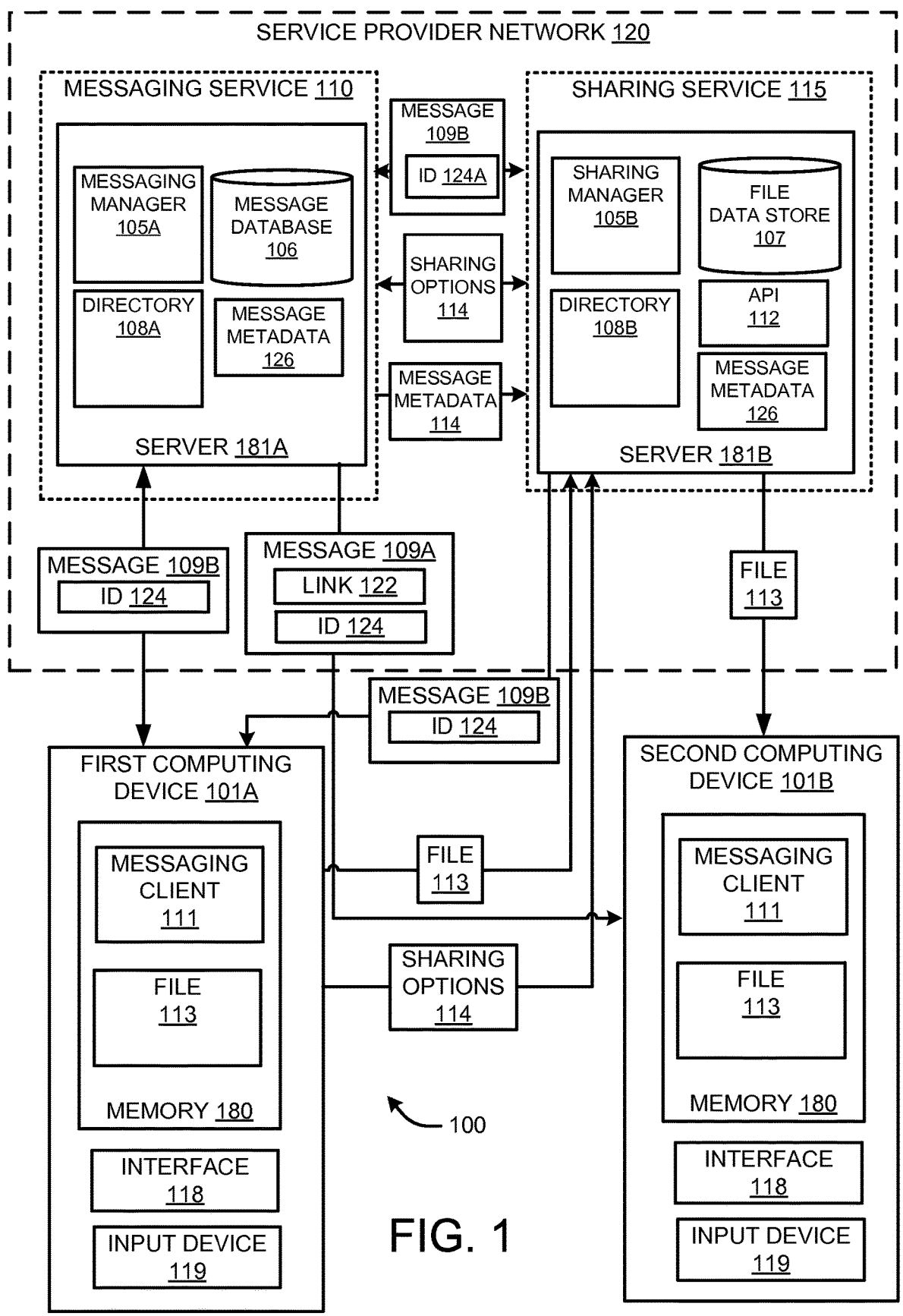
FIG. 1 is a block diagram depicting an illustrative framework in which electronic messages related to sharing a file may be associated by a sharing service using message metadata.

The following detailed description is directed to technologies for associating electronic messages relating to the sharing of a file. Utilizing the technologies described herein, electronic messages relating to the sharing of a file by a sharing service may be displayed within a same message thread. As used herein, a "message thread" may refer to two or more messages that are related. For example, electronic messages related to the sharing of a file, such as inviting users to share a file and receiving feedback for the file may be associated with the same message thread using message metadata. In some instances, the message metadata used to associate the electronic messages may be received by the sharing service from a messaging service that sent an initial electronic message to one or more recipients indicating that the file is available for sharing.

In some configurations, a user may specify the users that can access one or more shared files while composing an electronic message, such as an email. For example, a user may use a messaging client to specify the files to share as well as to set the sharing permissions required to access the shared files using a sharing service. In other examples, a user may specify the files to share and the sharing permissions using a user interface ("UI") associated with the sharing service.

The sharing service may provide access to the shared files to one or more users based on the sharing options set by a user. For instance, the sharing service may restrict or allow access to a file to a user based on the access settings specified by the user that composed and sent the electronic message or authorized the sharing of the file at the sharing service. The sharing service can also be referred to as a "collaboration service," since at least some examples of the sharing service can allow users to work together on a file. For example, users can exchange different versions of a file, while providing comments on the file.

After specifying the files to share, the messaging service and/or the sharing service may send a sharing message to the authorized users. For example, the messaging service may send a sharing message to the users that are authorized to share the file. The sharing message might provide a link to the file that is stored by the sharing service. In other examples, the sharing service might send a sharing message to the users authorized to share the file. In either case, a message identifier associated with the sharing message is determined and stored. As used herein, a "message identifier" may refer to a unique identifier for an electronic message (e.g., an email, a text message, or some other type of message). In some configurations, the messaging service used to send the sharing message creates the message identifier and places the message identifier within a message header of the sharing message. In some examples, the message header includes metadata about the message, such as but not limited to a message identifier, a time the message was sent, the subject, and the like.

According to some configurations, the message identifier for the sharing message is stored by the sharing service. Other metadata about the electronic message, which may be referred to herein as "message metadata" might also be stored. For example, the subject of the sharing message and the recipients of the message (e.g., the users authorized to provide feedback to the shared file) may be stored. The stored message metadata including the message identifier may be used by the sharing service and/or the messaging service to associate subsequent messages relating to the sharing of the file. For example, when a recipient of the sharing message provides feedback (e.g., makes or proposes one or more changes) to the shared file, a feedback message may be sent to the original sender (e.g., the user that authorized the sharing of the file) and/or other users indicating the feedback.

When the feedback message is received, the messaging client may include the feedback message as part of the same message thread that includes the initial sharing message. In this way, messages relating to the sharing of the same file with the authorized users may be displayed in a conversation view that includes all of the messages within the message thread. As such, the recipients of feedback messages will not have to manually search through the messages to locate messages related to the sharing of the file.

As briefly discussed, the message metadata and/or the sharing options may be transmitted from the messaging client to the sharing service. According to some configurations, the messaging client and/or the messaging service utilizes one or more network application programming interfaces ("APIs") to communicate data to the sharing service. In some cases, the messaging client might utilize the APIs to transmit the message metadata directly to the sharing service. In other cases, the messaging client might utilize the APIs to transmit the message metadata to a messaging service that transmits the settings to the sharing service. In still other examples, the sharing service may utilize the API to request the message metadata from the messaging client and/or the messaging service. Additional details regarding the various components and processes described above for associating electronic messages will be presented below with regard to FIGS. 1-12.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative framework 100 in which electronic messages related to sharing a file may be associated by a sharing service using message metadata. In some configurations, the framework 100 includes a messaging service 110 and a separate sharing service 115. In other configurations, a single service or more than two services might be utilized to provide the functionality described herein as being provided by the messaging service 110 and/or the sharing service 115. The messaging service 110 and the sharing service 115 may respectively manage the communication, sharing, and storage of messages and files between computing devices, such as a first computing device 101A and a second computing device 101B (also referred to herein generically and collectively as "computing devices 101").

For illustrative purposes, two computing devices 101 are shown in FIG. 1. Fewer or more computing devices 101 might be used in other implementations of the described techniques. According to some configurations, the messaging service 110, the sharing service 115 and the computing devices 101 are interconnected through one or more local and/or wide area networks (not shown). The functionality described herein may be provided by a service provider operated network-based distributed computing environment (which may be referred to herein as a "service provider network" 120). In some configurations, the messaging service 110 and/or the sharing service 115 may be implemented within the service provider network 120.

As described in more detail below, the service provider network 120 may include a collection of rapidly provisioned and, potentially, released computing resources. The computing resources may include a number of computing, networking and storage devices in communication with one another. In some configurations, the computing resources may correspond to physical computing devices. In other configurations, the computing resources may correspond to virtual machine instances implemented by one or more physical computing devices. In still other configurations, computing resources may correspond to both virtual machine instances and physical computing devices. The operator of the service provider network 120 may charge for the use of computing resources.

In some configurations, the messaging service 110 may be provided by one or more computing devices, such as server computing devices, or some other computing device or devices configured to perform the techniques described herein. For illustrative purposes, configurations of the messaging service 110 may include a server 181A storing a messaging manager 105A, a message database 106 and a directory 108A. As will be described in more detail below, the messaging manager 105A may access permission data stored in the directory 108A for controlling user access to messages and other data stored in the message database 106. The messaging manager 105A may be configured to manage the communication of messages 109 between one or more computing devices 101.

The sharing service 115 may be provided by one or more computing devices, such as server computing devices, or some other computing device or devices configured to perform the techniques described herein. For illustrative purposes, configurations of the sharing service 115 may include a server 181B storing a sharing manager 105B, a file data store 107 and a directory 108B. As will be described in more detail below, the sharing manager 105B may access permission data stored in the directory 108B for controlling user access to files and other data stored in the file data store 107. For illustrative purposes, the directory 108A of the messaging service 110 and the directory 108B of the sharing service 115 may be referred to herein collectively and generically as a "directory 108" or "directories 108.

The sharing manager 105B may also be configured to manage the communication of data associated with the files 113 between one or more computing devices 101. In addition, and as described in more detail below, the messaging service 110 and the sharing service 115 may coordinate through one or more communication interfaces to manage the communication of messages 109 and files 113 via a message client interface.

The computing devices 101 may each include memory 180 storing a file 113 and a messaging client 111. The computing devices 101 may also include a display interface 118 and an input device 119. The messaging client 111 may be configured to communicate with the messaging service 110 to receive, compose and send messages 109. In some examples, the messaging client 111 of each computing device 101 may be configured to instruct the sharing service 115 store one or more files, such as the file 113. The messaging client 111 may be in the form of a stand-alone application, or any other application or software module having features that interact with a user the messaging service 110 and the sharing service 115 via one or more devices, such as the input device 119 and the display interface 118. The input device 119 may be any device, such as a keyboard, and/or the display interface 118, which may include a touch-enabled screen configured to receive gestures from one or more users.

In some examples, the messaging service 110 and/or the messaging client 111 may cause the display of a message interface on the first computing device 101A. The message interface may include an editable text field and controls for associating a file (e.g. file 113 and/or a file already stored by the sharing service 115) with a message 109. In particular, a user may select one or more files and associate the selected files with the message 109. Upon receiving the selection of the one or more files, the first computing device 101A communicates data about the selected files to the sharing service 115.

In some examples, when the file 113 is not stored by the sharing service 115, the first computing device 101A may transmit the file 113 for storage in the file data store 107 associated with the sharing service 115. In other examples, when the file 113 is already stored by the sharing service 115, the first computing device 101A may transmit information associated with the selected files 113 to the sharing service 115. For instance, the first computing device 101A might receive and transmit sharing options 114 to the sharing service. In some examples, the sharing options 114 may relate to access settings, feedback settings and expiration settings that are associated with the sharing of the selected files 113 with one or more users.

According to some configurations, the messaging service 110 and/or the messaging client 111 generate one or more hyperlinks ("links") 122 that can be utilized to access the selected files stored by the sharing service 115. The messaging service 110 and/or the messaging client 111 may integrate the generated link 122 into the message 109A without user interaction. The message 109A including the link 122 might be communicated from the first computing device 101A to the second computing device 101B. The message 109A and the link 122 may be displayed on the interface 118 of the second computing device 101B.

When authorized (e.g., according to the specified sharing options 114), a user of the second computing device 101B may select the link 122 included in the message 109A to initiate the communication of data associated with the file 113 from the sharing service 115 to the second computing device 101B. According to some configurations, the sharing service 115 exposes one or more network application programming interfaces ("APIs"), such as the API 112. The API 112 can be accessed by various devices in communication with the sharing service 115 to access the functionality for setting the sharing options 114 using the messaging client 111 and associating messages 109 as described herein. The API 112 may be configured to support various protocols for various devices.

According to some examples, a user may specify the users that can access one or more shared documents while composing an electronic message. For example, a user may use the messaging client 111 to specify the files to be shared that are stored by the sharing service 115 as well as to set the permissions required to access the shared files, such as the file 113. In other examples, the user may use a UI provided by the sharing service 115 to specify the files to share as well as to set the permissions required to access the shared files. The sharing service 115 may provide access to files 113 stored by the sharing service, such as in the file data store 107, to users based on the access settings specified by the sharing options 114. For instance, the sharing service 115 may restrict access or allow access to the file 113 to a user based on the access settings (e.g., the permissions) associated with the file 113.

The messaging client 111 and/or the sharing service 115 might display an interface, such as a user interface ("UI") that may be utilized by the user to set the sharing options 114. In other configurations, the messaging client might receive the sharing options 114 using some other mechanism. For example, the messaging client 111 might be configured to receive voice data that specifies the sharing options 114. According to some configurations, the sharing options 114 include access settings, feedback settings, and expiration settings. The access settings may be used to specify the users that may access the file 113 specified to be shared in the message. For example, the access settings might include an option to allow only specified recipients of the electronic message 109A to access the shared files 113 specified by the message 109A and accessible using the sharing service 115.

The access settings may include an option to allow anyone that has access to the electronic message to access the shared files stored by the sharing service. The access settings might also allow the user to specify the users, such as a group of users (e.g., the people of an organization), that can access the shared files 113 stored by the sharing service 115. Other access settings that specify the users that can access the shared files might also be included in the UI. For example, an access setting that allows the user to specify access settings for each shared file on a per file and per user basis.

The feedback settings associated with the file 113 may be used to specify whether feedback is desired for the shared file 113 as well as a time period within which the feedback is desired. In some examples, the user may set a feedback deadline setting that specifies a date and time the feedback is due. The expiration settings may be used to specify whether access to the shared files is to expire. For example, the UI might display one or more settings that indicate that no expiration is to be associated with the sharing of the files 113 or that sharing of the files 113 should expire at a specified time.

The sharing options specified by the user composing the message 109 may be communicated from the messaging client 111 to the sharing service 115. According to some configurations, the messaging client 111 utilizes one or more network APIs, such as the API 112 exposed by the sharing service 115 to communicate the sharing options 115 that include the access settings, the feedback settings, and the expiration settings to the sharing service 115. In some cases, the messaging client 111 might utilize the API 112 to transmit the sharing options 114 directly to the sharing service 115. In other cases, the messaging client 111 might utilize the API 112 to transmit the sharing options 114 to the messaging service 110 that transmits the sharing options 114 to the sharing service 115. The sharing service 115 may manage the sharing of the specified files 113 using the received sharing options.

In some configurations, the sharing options 114 may specify that the file 113 is to be shared with all of the recipients of the message 109A. In this case, the sharing service 115 may set the permissions to access the file 113 such that each recipient identified by the message 109 may access the file 113. In other cases, the user composing the message 109 might specify other users that are allowed access to the file 113. In these cases, the sharing service 115 may set the permissions with the file 113 such that each user specified by the access settings in the sharing options 114 is allowed access to the file 113.

As also discussed above, the sharing options 114 may include feedback settings. The feedback settings may be used by the sharing service 115 to associate the time period within which feedback is requested with the file 113. In some examples, the sharing service 115 may be configured to provide one or more reminders to the authorized users, or recipients of the message 109, that feedback is requested and/or that the feedback is requested by a particular time.

In some examples, the expiration settings specified in the sharing options 114 may be used by the sharing service 115 to set the time the sharing of the file 113 is to expire. For instance, the sharing service 115 may set the user permissions used to access the file 113 to expire at the specified time. In other examples, a user might specify the sharing options 114 via a UI provided by the sharing service 115. For instance, a user might access the sharing service 115 and specify the sharing options 114 for one or more files 113.

As briefly discussed above, in response to sharing the file 113, the authorized users to share the file 113 may receive the message 109A (or some similar message) indicating that they have been authorized to share the file 113. In some cases, the recipients of the message 109A may be authorized to provide feedback for the file 113. As used herein, the term "feedback" may include changes to the file 113 and/or comments related to the file 113. As the authorized users (e.g., the recipients of the message 109A) provide feedback to the file 113, a message 109B may be delivered to other users.

After specifying the files to share, the messaging service 110 and/or the sharing service 115 may send the message 109A to the authorized users. For example, the messaging service 110 may send the message 109A to the users that are authorized to share the file 113. The sharing message, such as the message 109A, might provide the link 122 to the file 113 that is stored by the sharing service 115. In other examples, the sharing service 115 might send the message 109A to the users authorized to share the file 113. For example, the sharing service 115 may use the API 112 to instruct the messaging service 110 to send the message 109A to the recipients.

In either case, a message identifier, such as the ID 124, may be associated with the message 109A. As discussed briefly above, the messaging service 110 may create the message identifier 124 and place the message identifier 124 within a message header of the message 109A. In some examples, the message header for the message 109A includes metadata about the message, such as but not limited to a message identifier, a time the message was sent, the subject, and the like.

According to some configurations, the message identifier 124 for the message 109A is stored by the sharing service 115. Other metadata about the message 109A might also be stored. For example, the subject of the message 109A and the recipients of the message 109A may be stored. The stored message metadata 126 including the message identifier 124 may be used by the sharing service 115 and/or the messaging service 110 to associate subsequent messages relating to the sharing of the file(s) 113. For example, when a recipient of the message 109A provides feedback (e.g., makes or proposes one or more changes) to the shared file 113, a feedback message 109B may be sent to the original sender (e.g., the user that authorized the sharing of the file) and/or other users indicating the feedback.

When the feedback message 109B is received, the messaging client 111 may include the feedback message 109B as part of the same message thread that includes the initial sharing message 109A. In this way, messages relating to the sharing of the same file 113 with the authorized users may be displayed in a conversation view that includes all of the messages within the message thread. As such, the recipients of feedback messages will not have to manually search through the messages to locate messages related to the sharing of the file.

As briefly discussed, the message metadata 126 and/or the sharing options 114 may be transmitted from the messaging client 111 to the sharing service 115. According to some configurations, the messaging client 111 and/or the messaging service 110 utilizes the API 112 to communicate data to the sharing service 115. In some cases, the messaging client 111 might utilize the API 112 to transmit the message metadata 126 directly to the sharing service 115. In other cases, the messaging client 111 might utilize the API 112 to transmit the message metadata 126 to the messaging service 110 that transmits the message metadata 126 to the sharing service 115. In still other examples, the sharing service 115 may utilize the API 112 to request the message metadata 126 from the messaging client 111 and/or the messaging service 110.

As discussed, the message 109B is associated with the first sharing message 109A using the message metadata 126 that is related to the first sharing message 109A. In some examples, the message metadata 126 includes a message identifier 124 of the message 109A. In other examples, the message metadata 126 includes the message identifier 124, the subject of the message 109A and the recipients of the message 109A. More details on setting the sharing options are provided below.

Figure 2A:
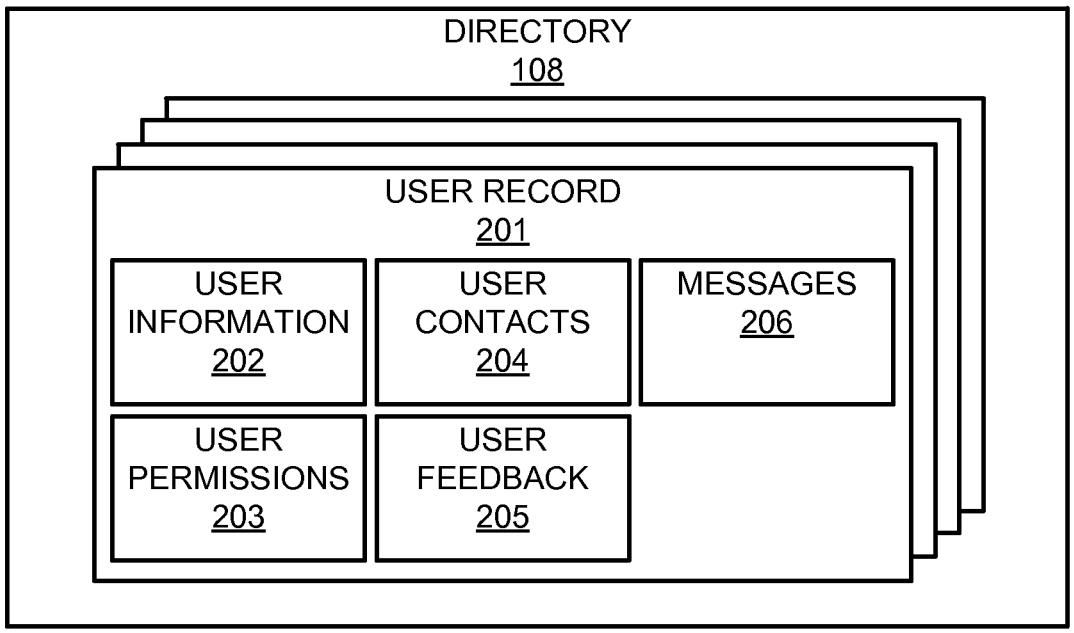
FIG. 2A is a block diagram depicting a directory.
Figure 2B:
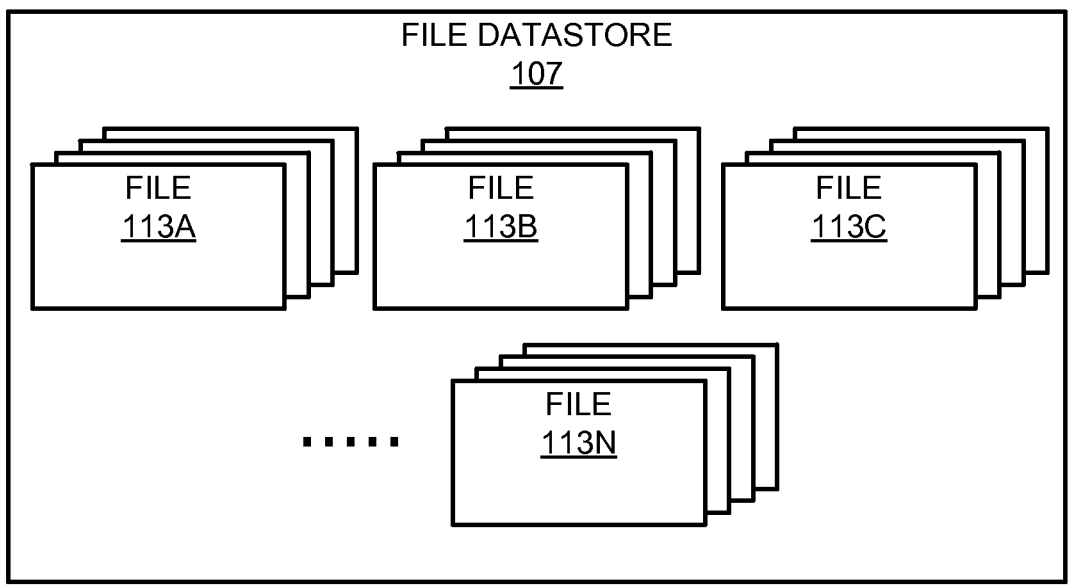
FIG. 2B is a block diagram depicting a file data store.

FIG. 2A is a block diagram depicting a directory 108 and FIG. 2B is a block diagram depicting the file data store 107 that might be utilized by the messaging service 110 and/or the sharing service 115. In some configurations, the directory 108 illustrated in FIG. 2A may include a number of records for defining access rights (e.g., as defined by the access settings specified in the sharing options 114) and permissions for users and/or identities accessing data stored by the sharing service 115 and possibly by the messaging service 110. As illustrated in FIG. 2A, an individual user record 201 may include the storage and/or association with different types of data, including, but not limited to user information 202, user permissions 203, user contacts 204, and user feedback 205. In some configurations, the user information 202 may store general identification information such as a user's name, email address, phone number and other contact information.

The user permissions 203 may contain one or more data structures for defining access rights to individual records, emails or files or other data. According to some examples, data defining access rights may be based on a per user and per record basis. Thus, individual files, directories, emails, feedback comments or other data may be controlled by the user permissions 203. The user contacts 204 may include a list of email addresses, phone numbers and identification information for other users. In some configurations, the user record 201 may include user feedback 205, which as will be described in more detail below, may include comments, notes and other data associated with files 113 stored in the file data store 107.

In some configurations, the directory 108 may include more or fewer types of data. In addition, for the sharing service 115, the directory 108 may contain a subset of the data types shown in the example of FIG. 2A. For instance, the directory 108B of the sharing service 115 may only include and/or utilize the user information 202 and user permissions 203.

The file data store 107 illustrated in FIG. 2B may include the storage of files 113A-113N, which are also referred to herein individually and generically as a "file 113" or "files 113." In some configurations, the file data store 107 may store different versions for each file 113A-113N, allowing users to select, edit, communicate and/or process newer or older versions of each file 113. In some configurations, among many other features, the file data store 107 may also store other types of data, such as the user feedback 205. In such configurations, the user feedback 205 may be stored in the files, or in other data fields.

Turning now to FIGS. 3-7, different examples of graphical user interfaces are illustrated as screen diagrams that display information relating to setting sharing options for files accessible through a sharing service from within a messaging client. The screen diagrams presented are for illustrative purposes only, and are not intended to be limiting. For example, other visual interface as well as non-visual interfaces (e.g., voice, touch) might be utilized to perform the functionality described herein.

Figure 3:
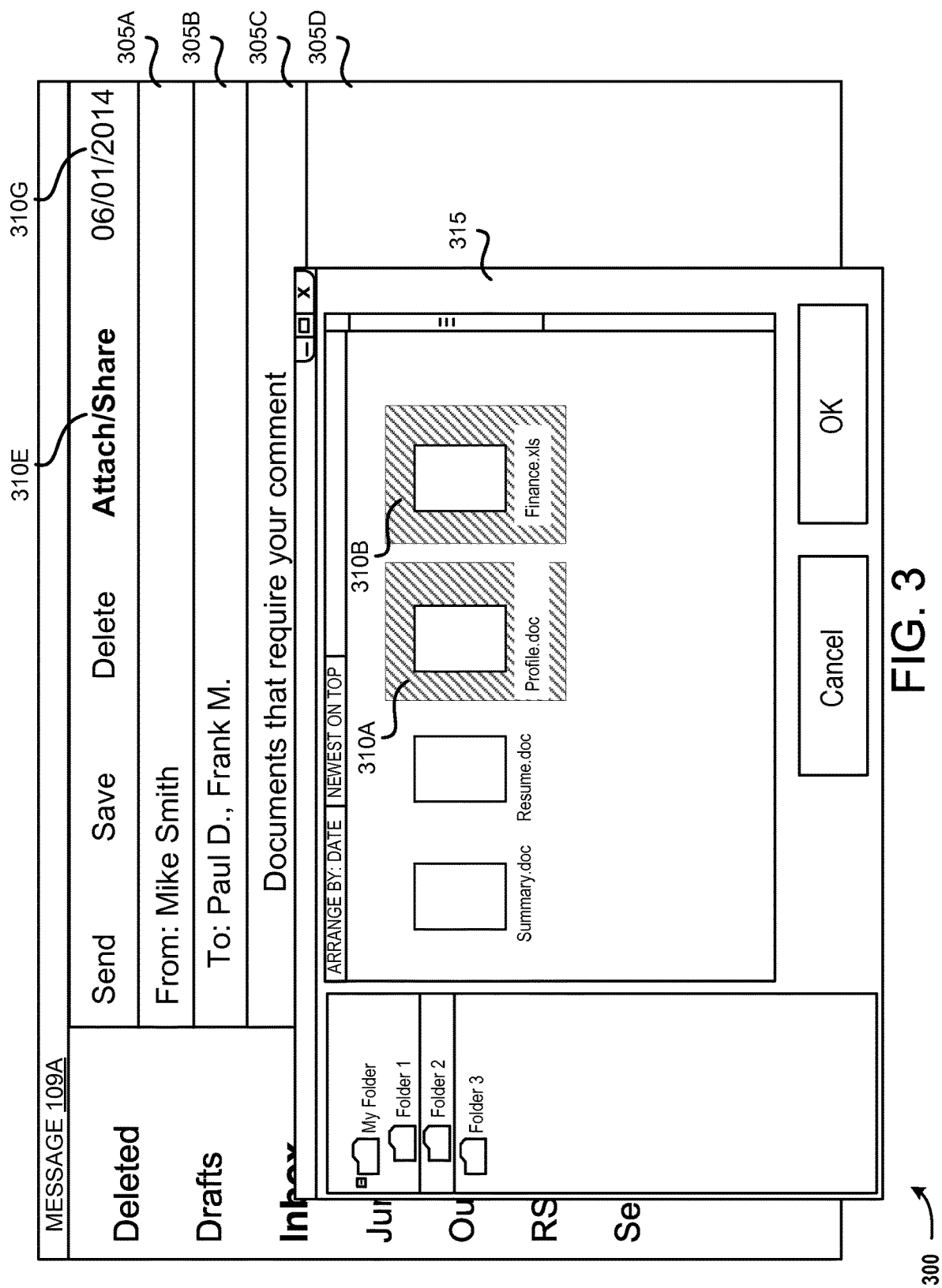
FIG. 3 is a screen diagram showing an illustrative graphical user interface ("UI") that displays data relating to selecting one or more files to share while composing a message.

FIG. 3 is a screen diagram showing an illustrative graphical UI 300 that displays data relating to selecting one or more files to share while composing a message 109A. The UI 300 may be generated by the messaging client 111, shown in FIG. 1, and presented on a computing device, such as the computing device 101A or 101B by an application, such as a web browser application.

As illustrated in FIG. 3, the UI 300 includes a display of the message 109A being composed. In the current example, the message 109A includes a "from" UI element 305A showing the sender of the message 109A, a "recipient" UI element 305B for specifying the recipients of the message 109A, a "subject" UI element 305C for specifying the subject of the message 109A, message area UI element 305D for entering text of the message 109A, and a "share" UI element 310E for specifying one or more files 113 to share.

A user may select the share UI element 310E to share one or more files 113. In the current example, the file selection UI element 315 is displayed in response to the user selecting the share UI element 310E. The files illustrated in the UI element 315 may be stored on a local data store or a network data store. For example, the files might be stored by the first computing device 101A, the second computing device 101B or stored by the sharing service 115.

As illustrated, the user has selected two files 113 for sharing. The first file 113 selected is the "profile.doc" file represented by file UI element 310A. The second file 113 selected is the "finance.xls" file represented by file UI element 310B. In other examples, different UI elements or mechanisms may be used to select the files to be shared. For example, the user might drag and drop a file to a location within the message 109.

After the user has selected the files 113 to be shared, the user may select the OK button. In response to selecting the OK button, the file selection UI element 315 may be closed and the message 109A may be sent by the messaging service 110 to the recipients authorized to share the file 113.

Figure 4:
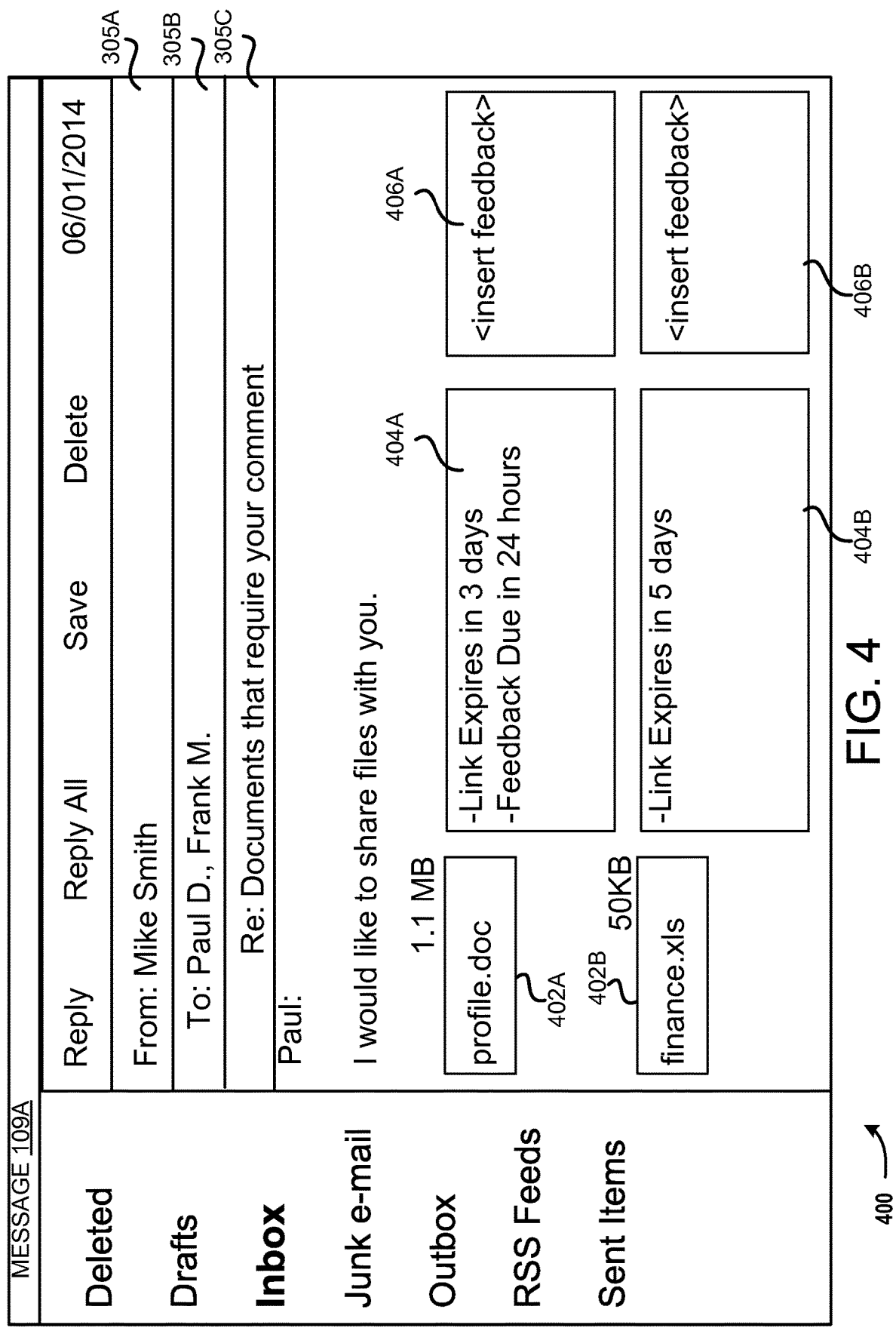
FIG. 4 is a screen diagram showing an illustrative graphical UI that displays data relating to the message and other graphical elements relating to sharing a file.

FIG. 4 is a screen diagram showing an illustrative graphical UI 400 that displays data relating to the message 109A and other graphical elements relating to sharing the files 113. The UI 400 may be generated by the messaging client 111, the messaging service 110 and/or the sharing service 115 shown in FIG. 1, and presented on a computing device, such as the computing device 101A or computing device 101B by an application, such as a web browser application.

As shown, the UI 400 illustrated in FIG. 4 is similar to the UI 300 illustrated in FIG. 3 in that the UI 400 contains the "from" UI element 305A for identifying the sender of the message 109, the "recipient" UI element 305B for identifying the recipients of the message 109A, the "subject" UI element 305C for specifying the subject of the message 109A, the message area UI element 305D for entering text of the message 109A. The UI 400 also contains links 402A-402B for the files 113 shared by the sharing service 115. In this example, the link 402A is configured to access the file "profile.doc" and the link 402B is configured to access the file "finance.xls."

As also shown in FIG. 4, the UI 400 includes feedback display elements 404A-404B and data entry elements 406A-406B. In some configurations, the feedback display elements 404 may include the display of text, images, charts or other types of data. In addition, the feedback display elements 404 may be arranged in one or more positions or layouts to indicate an association with a selected filed.

The feedback display element 404A shows an association with the file, "profile.doc." As illustrated, the feedback display element 404A displays the text "Link Expires in 3 days" and "Feedback Due in 24 hours." The feedback display element 404B shows an association with the file, "finance.xls." As shown, the feedback display element 404B displays the text "Link Expires in 5 days". These examples are provided for illustrative purposes and are not to be construed as limiting as other data may be displayed in a UI containing a message 109A.

In addition to the display of the links 402A-402B and the feedback display elements 404A-404B, the UI 400 may also include elements for receiving feedback data relating to a shared file. Specifically, the UI 400 includes a data entry element 406A and a data entry element 406B (also referred to herein generically as "data entry elements 406" or a "data entry element 406"). The data entry elements 406 may include editable text fields configured to receive data from a user and communicate the received data to one or more remote computers. In addition, the data entry elements 406 may include UI elements that allow images, video or other forms of data to be received by the UI 400.

Although the example of FIG. 4 involves the use of the data entry elements 406, the generation of a message UI, e.g., UI 400, may involve the use of graphical representations or placeholders. In some configurations, in the generation of UI 400, graphical representations or placeholders may be generated to show the author the general size, shape and/or position of the data entry elements 406 that will be displayed to the recipient(s) after the message 109A is delivered. Thus, prior to the delivery of the message 109A, the UI 400 may include placeholders, and after the delivery of the message, a UI displayed to a recipient of the message 109A may include data entry elements 406.

In some configurations, the data entry element 406A may be configured to receive feedback data for the "profile.doc" file 113 and the data entry element 406B may be configured to receive feedback data for the "finance.xls" file 113 from a recipient of the message 109A. The received data may be stored as feedback data, which may be stored in a file 113 associated with the data entry element 406 or in some other manner. As described above, the received data may also be stored as feedback data in one or more databases such as the directory 108B of the sharing service 115 or the directory 108A of messaging service 110.

Figure 6:
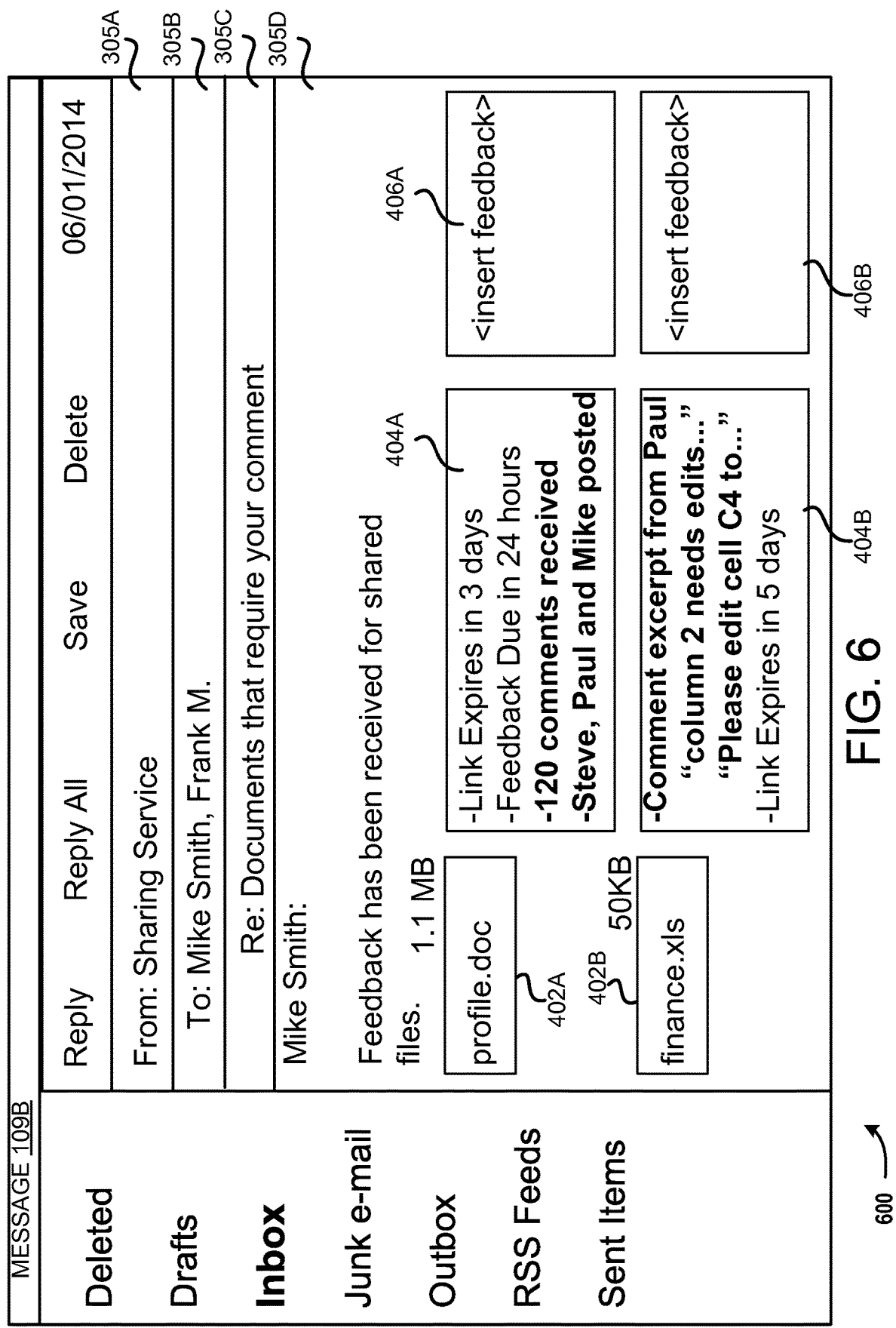
FIG. 6 is a screen diagram showing an illustrative graphical UI that displays data relating to the message delivered in response to receiving feedback for a file.

As discussed above, the feedback for a shared file 113 may be received using other mechanisms. For example, the recipient of the message 109A, might select an associated link 402 to access the shared file 113 at the sharing service 115. In other examples, a user might access the shared service 115 to provide feedback for a shared file 113, such as the shared file "profile.doc" and the "finance.xls" file. In some examples, after receiving feedback data associated with a file 113, a message indicating that feedback has been provided may be delivered to one or more users. For instance, the sharing service 115 may create a message as illustrated in FIG. 6 for delivery to the users that are authorized to provide feedback.

Figure 5:
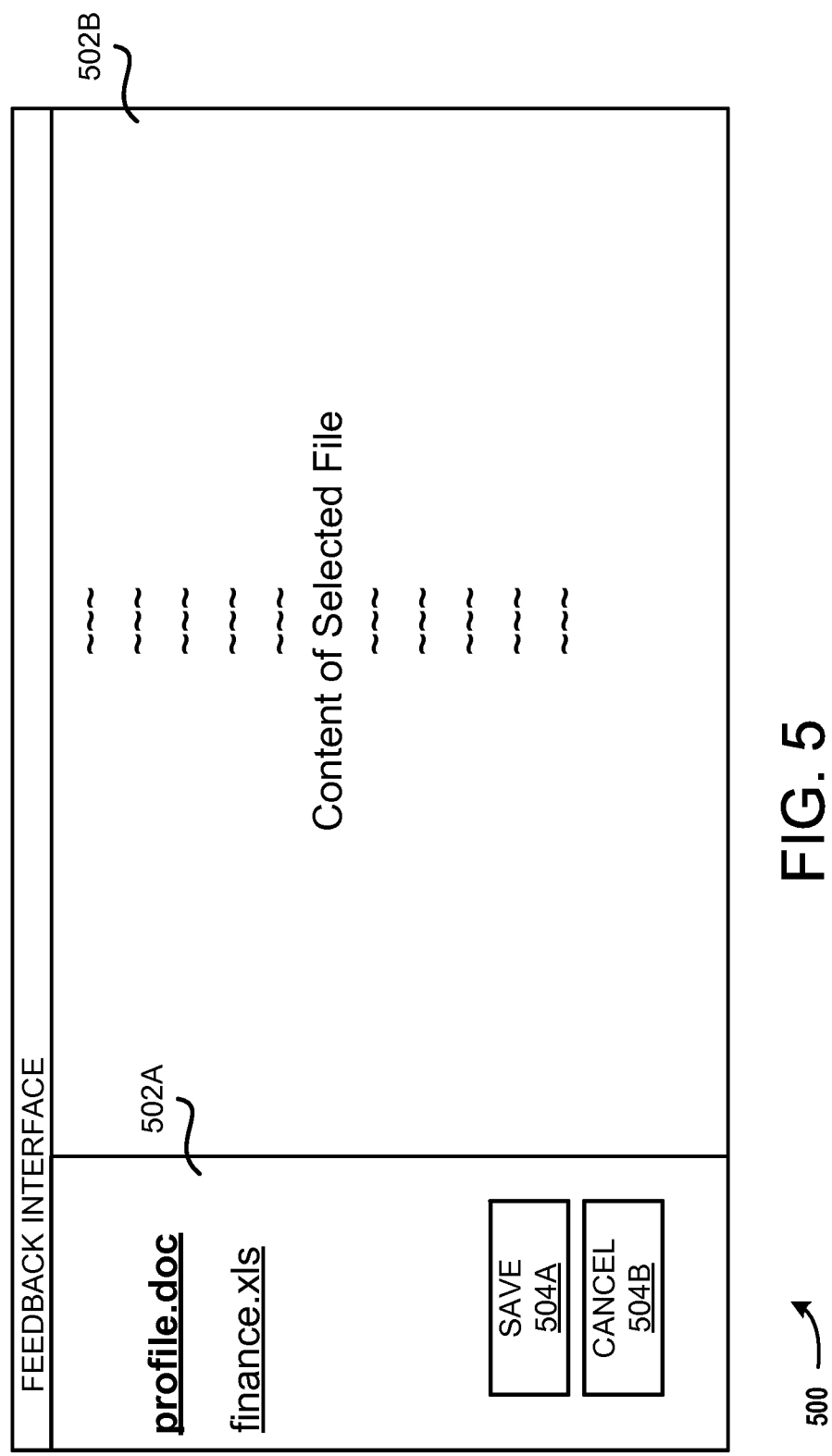
FIG. 5 is a screen diagram showing an illustrative graphical UI that displays data relating to receiving feedback for a file at the sharing service.

FIG. 5 is a screen diagram showing an illustrative graphical UI 500 that displays data relating to receiving feedback for a file 113 at the sharing service. The UI 500 may be generated by the sharing service 115, the messaging client 111, or the messaging service shown in FIG. 1, and presented on a computing device, such as the computing device 101A or computing device 101B by an application, such as a web browser application. In the current example, the UI 500 is generated by the sharing service 115.

As shown, the UI 500 illustrated in FIG. 5 includes file selection elements 502A, feedback entry area 502B, a save element 504A and a cancel element 504B. The UI 500 might be displayed in response to a user accessing the sharing service 115 to provide feedback for one or more files 113. In the current example, the user is authorized to provide feedback for the "profile.doc" file 113 and the "finance.xls" file 113. As illustrated, the user has selected the "profile.doc" file 113 (as indicated by the bolded text) to provide feedback.

In response to the selection of the file selection element for the file 113, the file 113 is displayed within the feedback entry area 502B. In some examples, the feedback entry area 502B displays the content of the selected file 113 in a same or similar manner as to the program that created the file. In other examples, the program that created the file may be used to receive the feedback. After providing feedback for the file 113, the user may select to save the feedback by selecting the save element 504A or to cancel the feedback by selecting the cancel 504B element. In response to saving the feedback, the sharing service 115 may cause a feedback message, such as shown in FIG. 6, to be provided to the users authorized to provide feedback.

FIG. 6 is a screen diagram showing an illustrative graphical UI 600 that displays data relating to the message 109B delivered in response to receiving feedback for a file. The UI 600 may be generated by the messaging client 111, the messaging service 110 and/or the sharing service 115 shown in FIG. 1, and presented on a computing device, such as the computing device 101A or computing device 101B by an application, such as a web browser application.

As shown, the UI 600 illustrated in FIG. 6 is similar to the UI 400 illustrated in FIG. 4 in that the UI 600 contains the "from" UI element 305A for identifying the sender of the message 109B, the "recipient" UI element 305B for identifying the recipients of the message 109B, the "subject" UI element 305C for specifying the subject of the message 109B, and the message area UI element 305D for entering text of the message 109A. The UI 600 also contains the links 402A-402B for the files 113 shared by the sharing service 115, the feedback display elements 404A-404B, and the feedback data entry elements 406A-406B.

In response to receiving feedback data for a file, the sharing service 115 may create the message 109B. In the current example, the sharing service 115 has added data relating to the received feedback next to the file 113 that received the feedback. The feedback display element 404A includes a summary of the activity relating to the feedback for the "profile.doc" file 113. In this example, the feedback display element 404A displays the text "120 comments received" and the text "Steve, Paul and Mike posted," which are respectively communicating the user activity and user information relating to the provided feedback.

Also shown in FIG. 5, for illustrative purposes, the feedback display element 404B displays at least a portion of the feedback data received from a user authorized to provide feedback to the file "finance.xls." In the current example, feedback element 404B includes a portion of a comment "column 2 needs edits . . . " and "Please edit cell C4 to . . . ". In this example, the comments are displayed with data identifying users that are associated with the comments and data identifying an expiration date. These examples are provided for illustrative purposes and are not to be construed as limiting.

Figure 7:
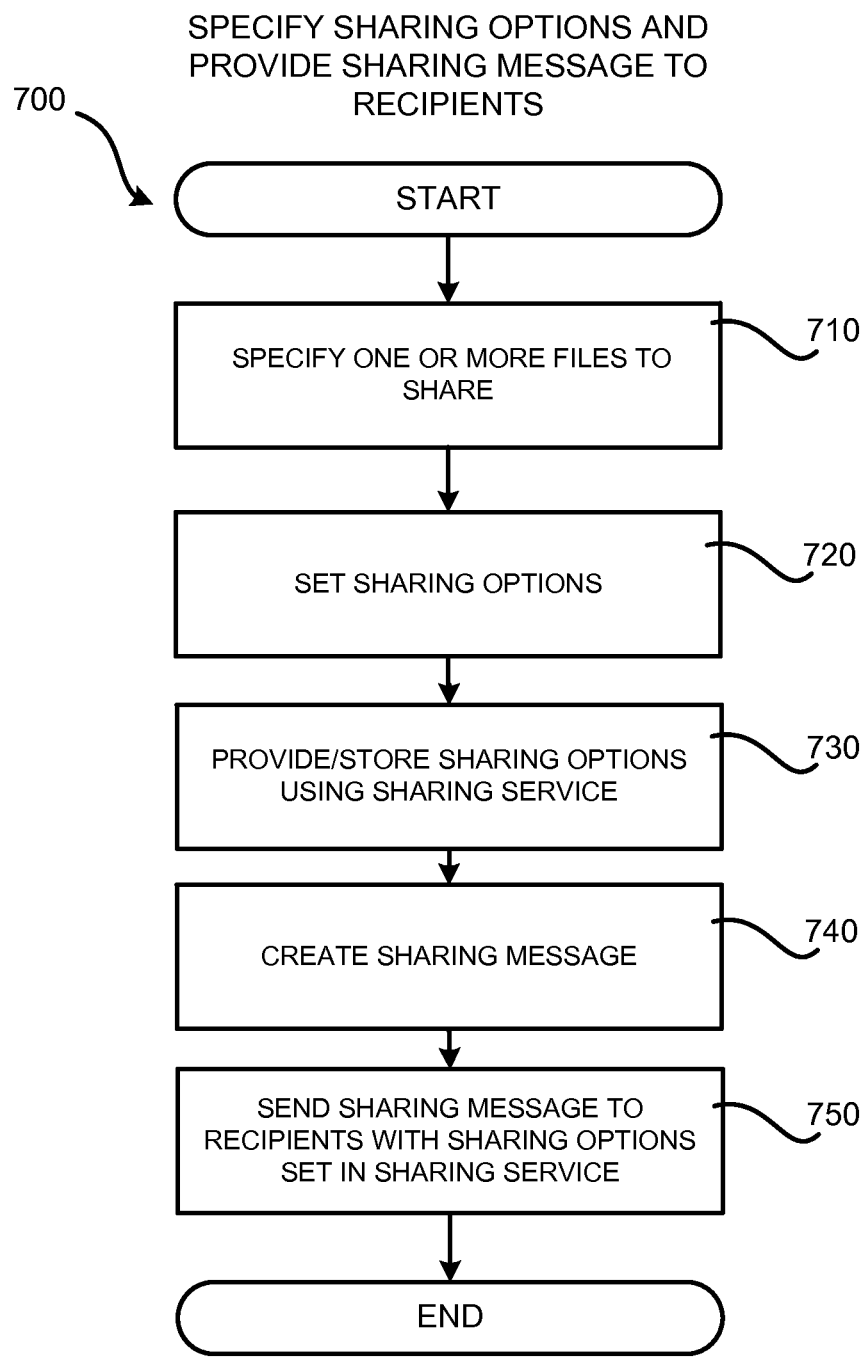
FIG. 7 is a flow diagram showing a routine illustrating aspects of a mechanism disclosed herein for specifying sharing options for one or more files associated with a sharing service.
Figure 8:
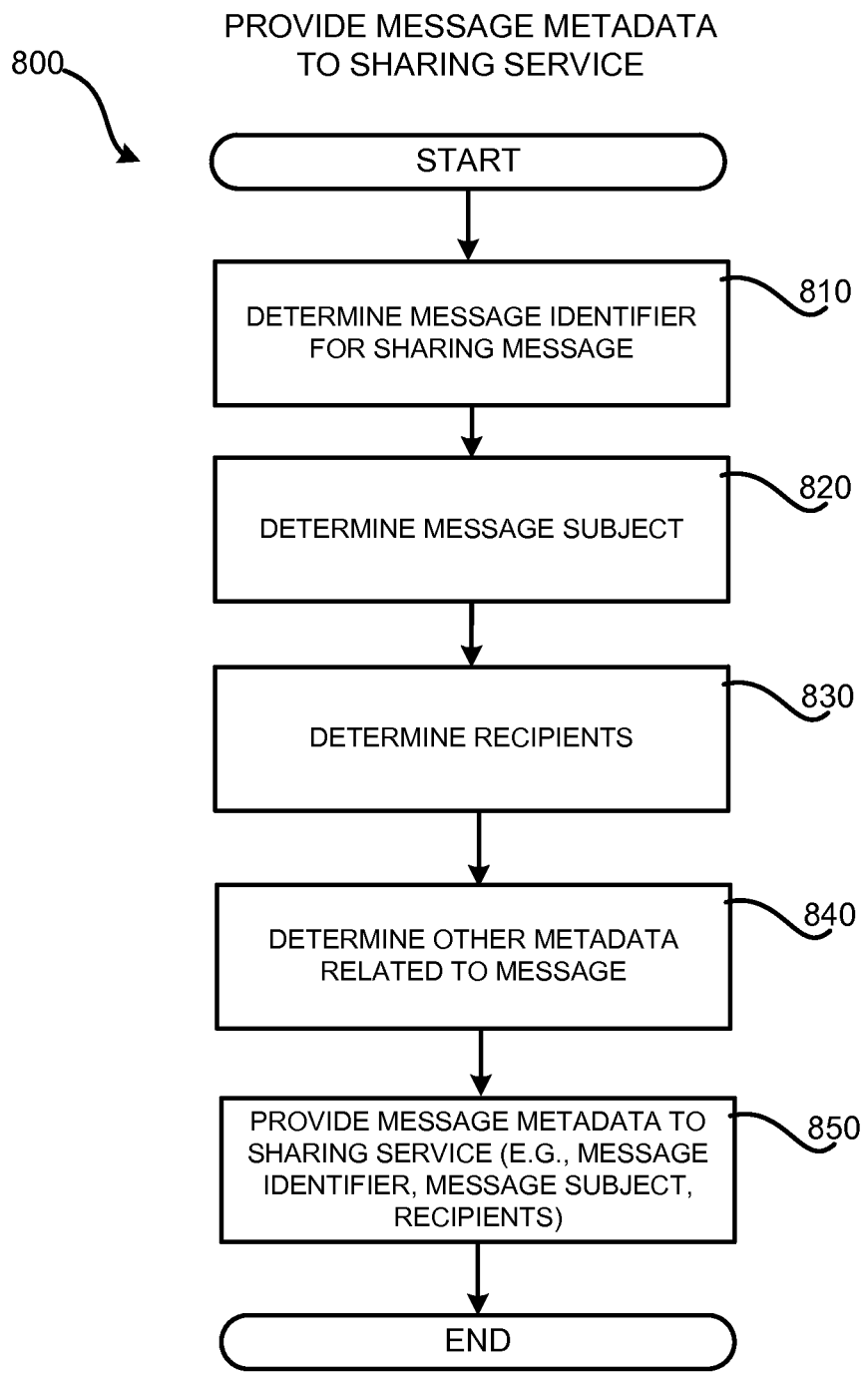
FIG. 8 is a flow diagram showing a routine illustrating aspects of a mechanism disclosed herein for providing message metadata to a sharing service.
Figure 9:
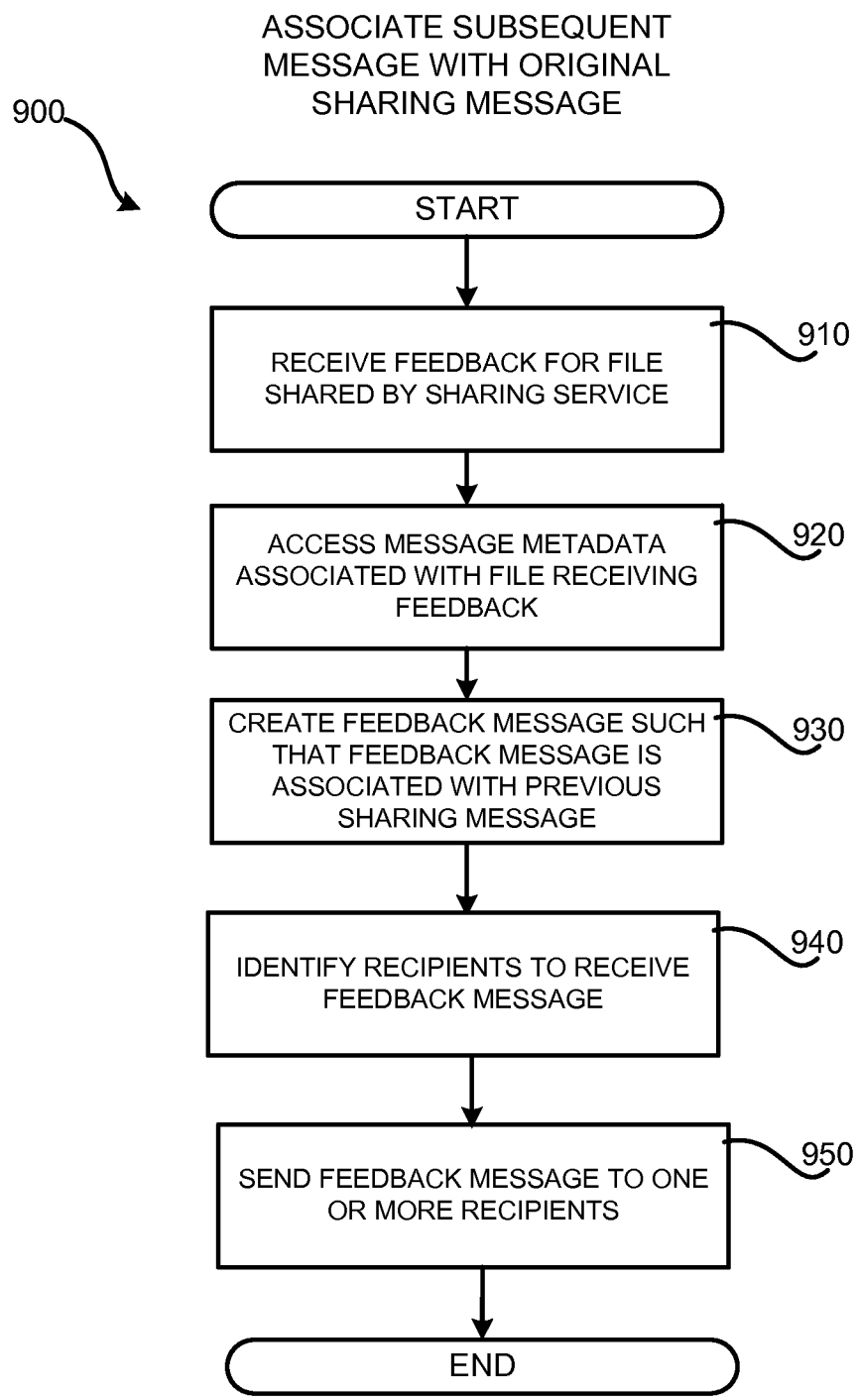
FIG. 9 is a flow diagram showing a routine illustrating aspects of a mechanism disclosed herein for associating a subsequent message with an initial sharing message.

FIGS. 7, 8 and 9 are flow diagrams showing routines that illustrate aspects of associating electronic messages related to the sharing of files, according to examples disclosed herein. It should be appreciated that the logical operations described herein with respect to FIGS. 7, 8 and 9, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 7 is a flow diagram showing a routine 700 illustrating aspects of a mechanism disclosed herein for specifying sharing options for one or more files associated with a sharing service 115. The routine 700 may begin at operation 710, where one or more files to share are specified. As discussed above, a user might specify the files 113 to share while composing an electronic message 109A using a messaging client 111 that is associated with the messaging service 110. In other examples, the user selects one or more files to share by accessing the sharing service 115.

From operation 710, the routine 700 may proceed to operation 720, where the sharing options for the files to be shared are set. As discussed above, the sharing options might include access settings, feedback settings, and expiration settings relating to the files to be shared. The sharing options might be specified using a messaging client 111, the sharing service 115 and/or some other mechanism.

From operation 720, the routine 700 may proceed to operation 730, where the sharing options are provided/stored using the sharing service 115. As discussed above, the messaging client 111 might utilize the API 112 to transmit the settings for the sharing options 114 directly to the sharing service 115. In other cases, the messaging client 111 might utilize the API 112 to transmit the settings to the messaging service 110 that may then transmit the settings to the sharing service 115. When the settings for the sharing options 114 are specified at the sharing service 115, the sharing service 115 may store the settings for the sharing options within a memory, such as the data store 107. The sharing service 115 uses the received settings to configure the sharing settings for one or more of the files to be shared.

From operation 730, the routine 700 may proceed to operation 740, where a sharing message 109A is created. As discussed above, the sharing message 109A may be created using the messaging client 111, the messaging service 110 and/or the sharing service 115. For example, a user might select the files 113 to share while composing the message 109A. In other examples, the sharing service 115 may create the sharing message 109A after the user has specified the files 113 to share. In some examples, the messaging client 111 and/or the sharing service 115 might cause a link to be displayed within the body of the message 109A along with a display area indicating the different sharing options that have been set. The message 109A might also include one or more feedback data entry elements configured to receive feedback for a file 113.

From operation 740, the routine 700 may proceed to operation 750, where the message 109A may be sent to one or more recipients by the messaging service 110. For example, the messaging service 110 may send an email, a text message, an SMS, or some other type of electronic message indicating the shared files 113. As discussed above, the sharing options 114 may be communicated to and/or stored by the sharing service 115 before the message is sent to the recipient(s). The routine 700 may then proceed to an end operation. Alternately, the routine 700 might proceed back to repeat some or all of the processing operations described above. For example, from operation 750, the routine 700 may proceed back to operation 710.

FIG. 8 is a flow diagram showing a routine 800 illustrating aspects of a mechanism disclosed herein for providing message metadata 126 to a sharing service 115. The routine 800 may begin at operation 810, where the message identifier 124 for a sharing message 109A is determined. As discussed above, the messaging identifier 124 may be determined by the messaging service 110 in response to sending the message 109A to one or more recipients. In some examples, the messaging service 110 may store the messaging identifier 124 within a data store, or some other memory.

From operation 810, the routine 800 may proceed to operation 820, where the subject of the sharing message 109A is determined. As discussed above, a user might specify the subject of the sharing message 109A or the sharing service 115 might specify the subject of the sharing message 109A. In some examples, the messaging service 110 may store the subject within a data store, or some other memory.

From operation 820, the routine 800 may proceed to operation 830, where the recipients of the sharing message 109A are determined. As discussed above, a user sharing the file 113 may specify the recipients while composing the message 109A and/or by accessing the sharing service 115. In some examples, the messaging service 110 may store the recipients of the message 109A within a data store, or some other memory.

From operation 830, the routine 800 may proceed to operation 840, where other metadata related to the message 109A may be determined. As discussed above, the metadata associated with a message might include a variety of data such as, but not limited to, attachments to a message, content within a message, a time of the message, and the like.

From operation 840, the routine 800 may proceed to operation 850, where the message metadata may be provided to the sharing service 115. As discussed above, the message metadata 126 associated with a message 109A, or possibly some other message, might be sent by the messaging client 111 and/or the messaging service 110 to the sharing service 115 using the API 112. The routine 800 may then proceed to an end operation.

FIG. 9 is a flow diagram showing a routine 900 illustrating aspects of a mechanism disclosed herein for associating a subsequent message 109B with an initial sharing message 109A. The routine 900 may begin at operation 910, where feedback for a file 113 shared by the sharing service 115 is received. As discussed above, the feedback data for the file 113 may be received from a messaging client 111, a messaging service 110 and/or from the sharing service 115.

From operation 910, the routine 900 may proceed to operation 920, where the message metadata 126 that is associated with the file 113 is accessed. As discussed above, the sharing service 115 may access the message metadata 126 from a memory, such as from a data store 107. In other examples, the sharing service 115 might request the message metadata 126 from the messaging service 110 using the API 112.

From operation 920, the routine 900 may proceed to operation 930, where the feedback message 109B is created such that the feedback message 109B is associated with previous messages, such as the message 109A, related to the sharing of the file 113. As discussed above, the message 109B may be created by the sharing service 115 in response to receiving feedback for the file 113. In other configurations, the messaging client 111 and/or the messaging service 110 may be utilized to create the message 109B. In some examples, the sharing service 115, the messaging service 110 and/or the messaging client 111 may insert feedback data 123 into the message 109B based on the feedback data received. In other examples, a user might specify the content to include within the message 109B. Operation 930 may also involve the generation of one or more UI elements for receiving further feedback data within the message 109B. The feedback data and the elements for receiving feedback data may be integrated into the body of the message 109B.

Before the subsequent message 109B is sent, the sharing service 115, or some other component, associates the message identifier 124 of the original message 109A relating to the sharing of the file(s) with the message 109B. In some examples, the message identifier 124 is inserted within a message header of the message 109B. In this way, when a messaging client that supports viewing conversations (e.g., message threads) displays the message 109B, the message 109B may be displayed within the same message thread as previous messages (e.g., the message 109A) related to the sharing of the file 113.

From operation 930, the routine 900 may proceed to operation 940, where the recipients to send the message 109B are identified. As discussed above, the sharing service 115, or some other user or component, may identify the recipients to receive the message 109B. According to some configurations, the identified recipients are determined from the message metadata 126 associated with the message 109A. In some examples, the identified recipients are the users that are authorized to share the file 113. In other examples, the identified recipients are the sender of the original sharing message 109A and the recipients of the sharing message 109A, such as the recipients of the sharing message 109A that did not provide the feedback.

From operation 940, the routine 900 may proceed to operation 950, where the message 109B is sent to the identified recipients. As discussed above, the message 109B may be sent by the messaging service 110 to the identified recipients. In some configurations, the sharing service 115 instructs the messaging service 110 to send the message 109B to the identified recipients. The routine 900 may then proceed to an end operation. Alternately, the routine 900 might proceed back to repeat some or all of the processing operations described above. For example, from operation 950, the routine 900 may proceed back to operation 910.

Figure 10:
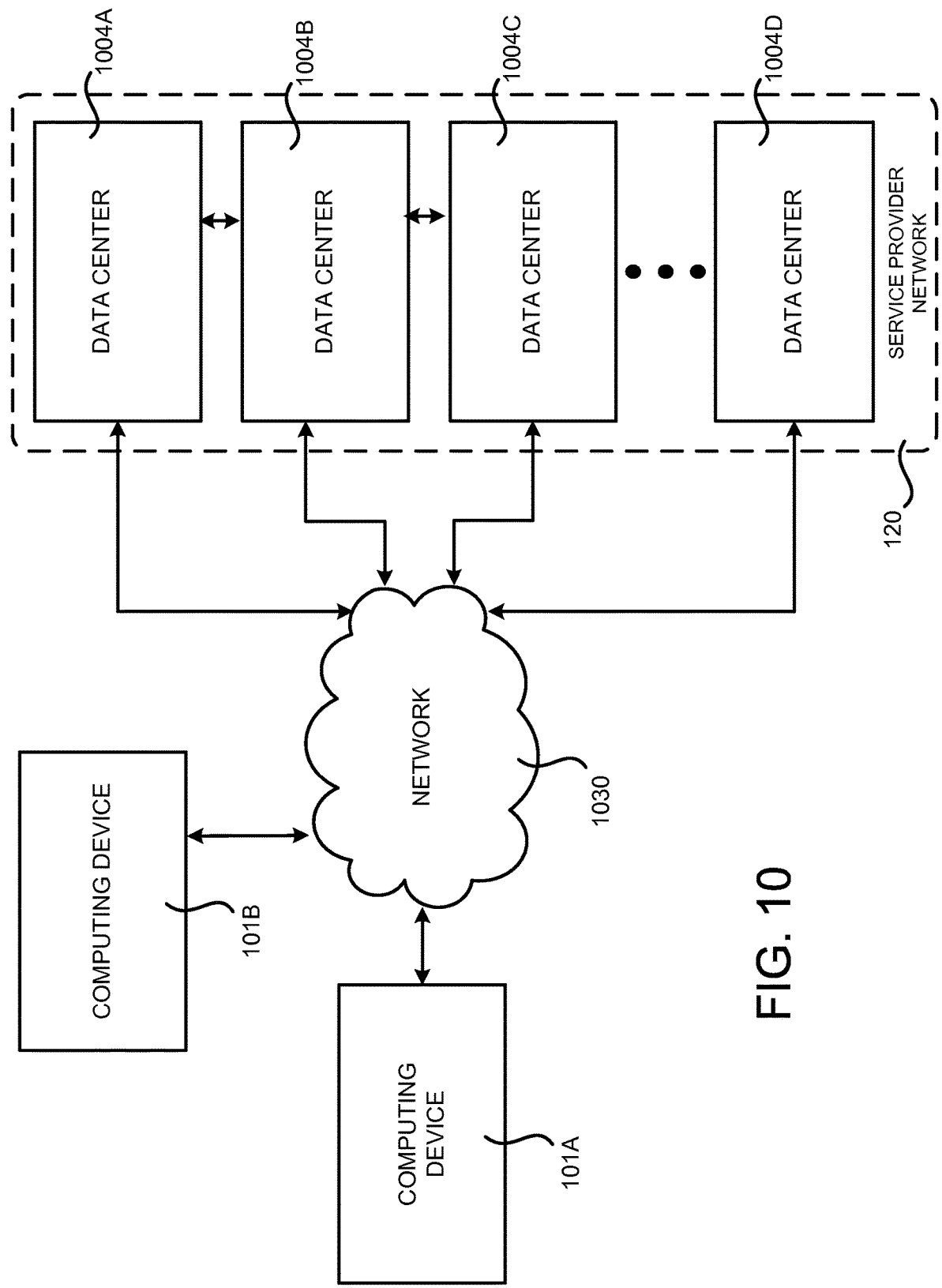
FIG. 10 is a system and network diagram that shows one illustrative operating environment for examples disclosed herein that includes a service provider network.

FIG. 10 and the following description are intended to provide a brief, general description of a suitable computing environment in which the examples described herein may be implemented. In particular, FIG. 10 is a system and network diagram that shows an illustrative operating environment that includes a service provider network 120. As discussed above, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 1004A-1004N (which may be referred to herein singularly as "a data center 1004" or collectively as "the data centers 1004"). The data centers 1004 are facilities utilized to house and operate computer systems and associated components. The data centers 1004 typically include redundant and backup power, communications, cooling and security systems. The data centers 1004 might also be located in geographically disparate locations. One illustrative configuration for a data center 1004 that implements some or all of the concepts and technologies disclosed herein for annotating resources in the service provider network 120 will be described below with regard to FIG. 11.

The users and customers of the service provider network 120 may access the computing resources provided by the data centers 1004 over a suitable data communications network, such as a Wide Area Network ("WAN"), as illustrated by the network 1030. Although a WAN might be used, it should be appreciated that a local-area network ("LAN"), the Internet, or any other networking topology known in the art that connects the data centers 1004 to the computing device 101A, and the computing device 101B may be utilized. It should also be appreciated that combinations of such networks might also be utilized.

Figure 11:
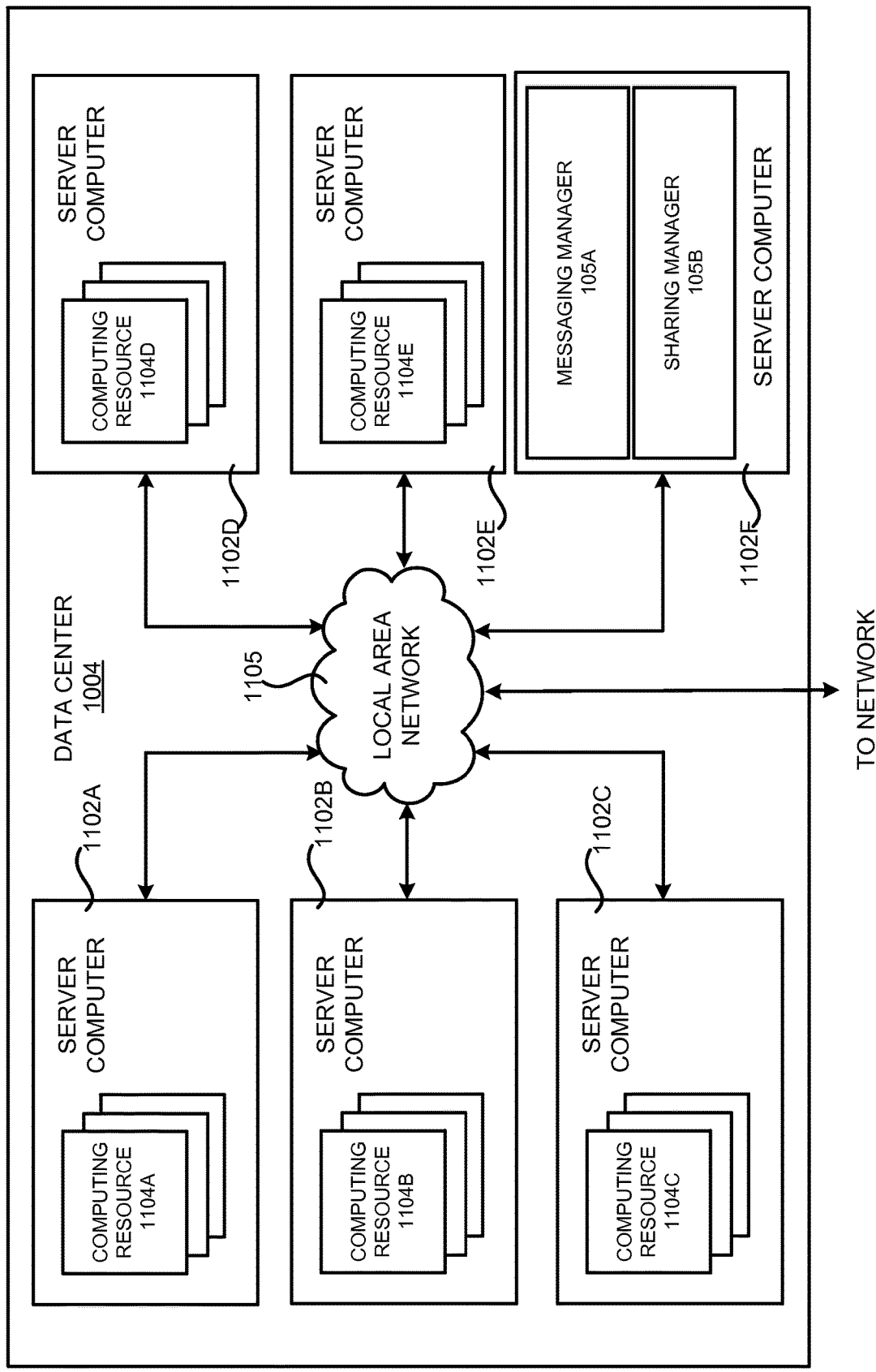
FIG. 11 is a computing system diagram that illustrates one configuration for a data center that implements aspects of the concepts and technologies disclosed herein for associating messages related to files shared by a sharing service.

FIG. 11 is a computing system diagram that illustrates one configuration for a data center 1004 that implements aspects of a service provider network 120, including some or all of the concepts and technologies disclosed herein for associating messages 109 related to files 113 shared by a sharing service 115. The example data center 1004 shown in FIG. 11 includes several server computers 1102A-1102F (which may be referred to herein singularly as "a server computer 1102" or in the plural as "the server computers 1102") for providing computing resources. The server computers 1102 may be standard tower or rack-mount server computers configured appropriately for providing the computing resources described herein. According to an example, the server computers 1102 are configured to execute the software products as described above.

In one example, some of the computing resources 1104 are virtual machine instances. As known in the art, a virtual machine instance is an instance of a software implementation of a machine (i.e. a computer) that executes programs like a physical machine. Each of the server computers 1102 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 1102, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 1004 shown in FIG. 11 also includes a server computer 1102F reserved for executing software components for managing the operation of the data center 1004, server computers 1102, virtual machine instances, and other resources within the service provider network 120. The server computer 1102F might also execute the messaging manager 105A and/or the sharing manager 105B. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 1004 shown in FIG. 11, an appropriate local area network ("LAN") 1105 is utilized to interconnect the server computers 1102A-1102E and the server computer 1102F. The LAN 1105 is also connected to the network 1030 illustrated in FIG. 10. It should be appreciated that the configuration and network topology illustrated in FIGS. 10 and 11 has been greatly simplified and that many more computing systems, networks and networking devices may be utilized to interconnect the various computing systems disclosed herein. Appropriate load balancing devices or software modules might also be utilized for balancing a load between each of the data centers 1004A-1004N, between each of the server computers 1102A-1102F in each data center 1004 and between virtual machine instances and other types of computing resources provided by the service provider network 120.

It should be appreciated that the data center 1004 described in FIG. 11 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 12:
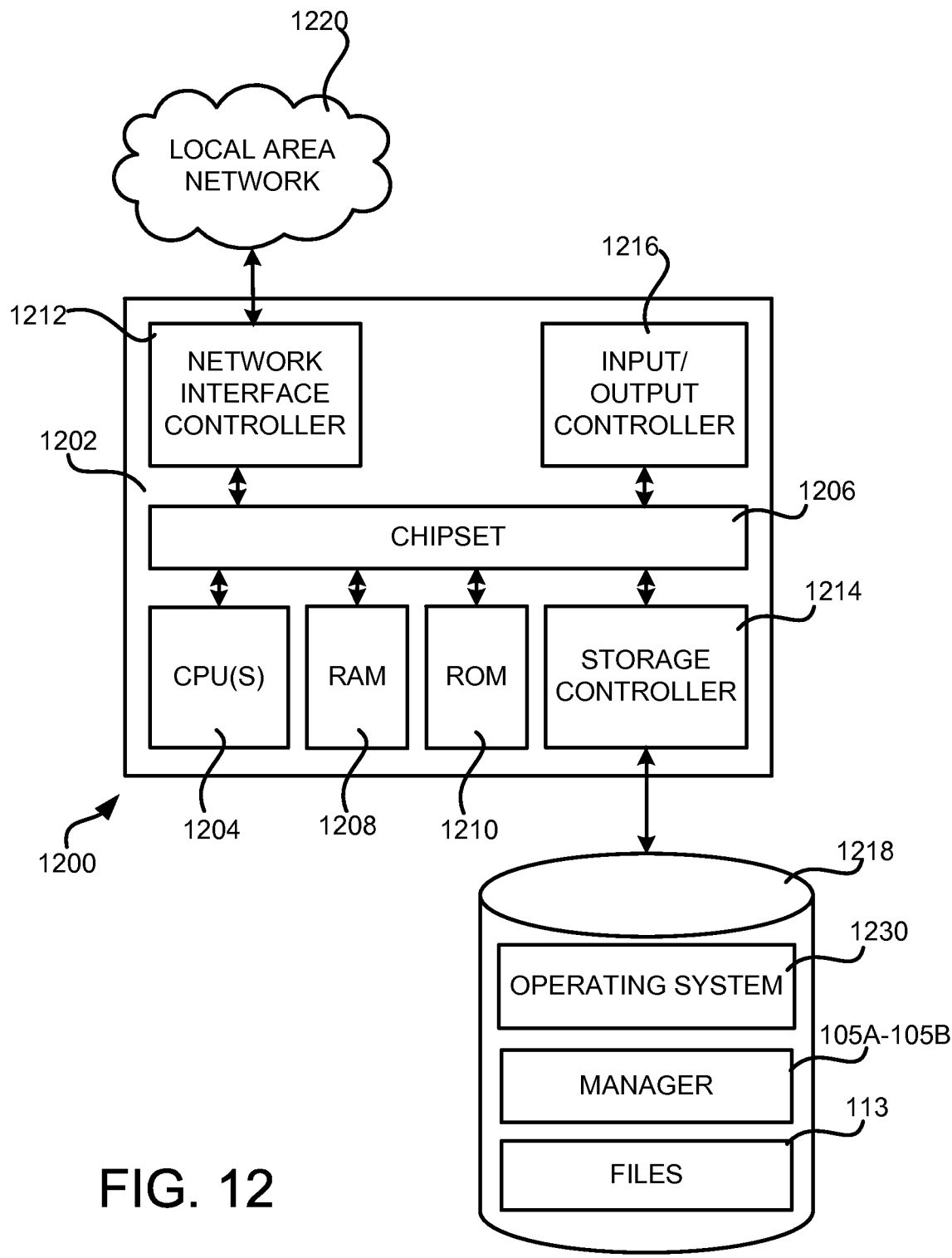
FIG. 12 is a computer architecture diagram showing an illustrative computer hardware architecture for implementing a computing device that might be utilized to implement aspects of the various examples presented herein.

FIG. 12 shows an example computer architecture for a computer 1200 capable of executing program components for associating messages 109 related to files 113 shared by a sharing service 115 in the manner described above. The computer architecture shown in FIG. 12 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 12 may be utilized to execute software components for performing operations as described above. The computer architecture shown in FIG. 12 might also be utilized to implement a computing device 101A or 101B or any other of the computing systems described herein.

The computer 1200 includes a baseboard 1202, or "motherboard," which is a printed circuit board to which a multitude of components or devices may be connected by way of a system bus or other electrical communication paths. In one illustrative example, one or more central processing units ("CPUs") 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1206 provides an interface between the CPUs 1204 and the remainder of the components and devices on the baseboard 1202. The chipset 1206 may provide an interface to a RAM 1208, used as the main memory in the computer 1200. The chipset 1206 may further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM may also store other software components necessary for the operation of the computer 1200 in accordance with the examples described herein.

The computer 1200 may operate in a networked environment using logical connections to remote computing devices and computer systems through a network, such as the local area network 1220. The chipset 1206 may include functionality for providing network connectivity through a network interface controller (NIC) 1212, such as a gigabit Ethernet adapter. The NIC 1212 is capable of connecting the computer 1200 to other computing devices over the local area network 1220. It should be appreciated that multiple NICs 1212 may be present in the computer 1200, connecting the computer to other types of networks and remote computer systems.

The computer 1200 may be connected to a mass storage device 1218 that provides non-volatile storage for the computer. The mass storage device 1218 may store system programs, application programs, other program modules and data, which have been described in greater detail herein. The mass storage device 1218 may be connected to the computer 1200 through a storage controller 1214 connected to the chipset 1206. The mass storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 may store data on the mass storage device 1218 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1218 is characterized as primary or secondary storage and the like.

For example, the computer 1200 may store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1218 by detecting the physical states or characteristics of one or more particular locations within the physical storage units.

In addition to the mass storage device 1218 described above, the computer 1200 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1200.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1218 may store an operating system 1230 utilized to control the operation of the computer 1200. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1218 may store other system or application programs and data utilized by the computer 1200, such as components that include the managers 105A-105B, the files 113, and/or any of the other software components and data described above. The mass storage device 1218 might also store other programs and data not specifically identified herein.

In one example, the mass storage device 1218 or other computer-readable storage media is encoded with computer-executable instructions which, when loaded into the computer 1200, transform the computer from a general-purpose computing system into a special-purpose computer capable of implementing the examples described herein. These computer-executable instructions transform the computer 1200 by specifying how the CPUs 1204 transition between states, as described above. According to one example, the computer 1200 has access to computer-readable storage media storing computer-executable instructions which, when executed by the computer 1200, perform the various routines described above with regard to FIGS. 7-9. The computer 1200 might also include computer-readable storage media for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, the input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for associating messages 109 related to files 113 shared by a sharing service 115 have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by one or more computers of a sharing service and one or more second computers of a messaging service, cause the one or more computers of the sharing service and the one or more second computers of the messaging service to:

receive, at the one or more computers of the sharing service, feedback data associated with a file shared by the one or more computers of the sharing service, the feedback data provided by a first recipient of a first electronic message associated with the sharing of the file by a first user;

cause the one or more second computers of the messaging service to transmit, over a network, the first electronic message to the first recipient;

cause the one or more second computers of the messaging service to transmit, over the network, a message identifier associated with the first electronic message to the one or more computers of the sharing service;

access, via the one or more computers of the sharing service, the message identifier stored by the sharing service;

create, via the one or more computers of the sharing service, a second electronic message associated with the message identifier and addressed to the first user indicating that the feedback data has been provided for the file shared by the sharing service; and transmit, from the one or more computers of the sharing service, the second electronic message to the first user, the second electronic message viewable within a message client as part of a message thread that includes the first electronic message and the second electronic message.

2. The non-transitory computer-readable storage medium of claim 1, wherein transmitting the second electronic message comprises identifying a second recipient of the first electronic message and causing the second electronic message to be sent to the second recipient.

3. The non-transitory computer-readable storage medium of claim 1, wherein the feedback data is received via a sharing interface provided by the sharing service.

4. The non-transitory computer-readable storage medium of claim 1, wherein the feedback data is received from a messaging client utilizing an application programming interface to communicate the feedback data to the sharing service.

5. The non-transitory computer-readable storage medium of claim 1, wherein creating the second electronic message comprises including the message identifier and a subject of the first electronic message within a message header of the second electronic message.

6. A computer-implemented method, comprising:
identifying that feedback was provided that is associated with a file shared by one or more computers of a sharing service;
causing one or more second computers of a messaging service to transmit, over a network, a first electronic message to a first recipient, wherein the first electronic message relates to sharing of the file;
causing the one or more second computers of a messaging service to transmit over the network, a message identifier associated with the first electronic message to the one or more computers of the sharing service;
accessing, from the one or more computers of the sharing service, message metadata, the message metadata including a message identifier for a first electronic message relating to a sharing of the file;
generating using the message data, via the one or more computers of the sharing service, a second electronic message that is part of a same message thread as the first electronic message; and
causing the one or more second computers of the messaging service to transmit the second electronic message to one or more recipients.

7. The computer-implemented method of claim 6, wherein identifying that the feedback was provided for the file comprises receiving, at the one or more computers of the sharing service, feedback data from the messaging client.

8. The computer-implemented method of claim 6, further comprising receiving, at the one or more computers of the sharing service, the message identifier associated with the first electronic message and created by the messaging service.

9. The computer-implemented method of claim 6, wherein the message metadata further includes recipients of the first electronic message and a subject of the first electronic message.

10. The computer-implemented method of claim 6, wherein causing the one or more second computers of the messaging service to transmit the second electronic message comprises instructing the one or more second computers of the messaging service via an application-programming interface (API) to transmit the second electronic message to the one or more recipients.

11. The computer-implemented method of claim 6, wherein causing the one or more second computers of the messaging service to transmit the second electronic message comprises identifying the one or more recipients by determining recipients of the first electronic message and a sender of the first electronic message.

12. The computer-implemented method of claim 6, wherein generating the second electronic message comprises including the message identifier within a message header of the second electronic message.

13. The computer-implemented method of claim 6, further comprising causing display of a user interface, associated with the sharing service, for receiving feedback data for the file.

14. The computer-implemented method of claim 6, further comprising receiving, from one or more of a messaging client or the one or more second computers of the messaging service, an indication to share the file with recipients of the first electronic message.

15. A system, comprising:
a sharing service, comprising one or more computers including one or more processors operative to perform actions to:
identify that feedback was provided for a file shared by the sharing service;
cause one or more second computers of a messaging service to transmit, over a network, a first electronic message to one or more recipients, wherein the first electronic message relates to sharing of the file;
cause one or more second computers of a messaging service to transmit, over the network, a message identifier associated with the first electronic message to the one or more computers of the sharing service;
access message metadata associated with the file from the sharing service, the message metadata including a message identifier associated with the first electronic message sent by a sender to the one or more recipients relating to the sharing of the file by the sharing service;
create a second electronic message that is associated with the first electronic message using the message metadata;
identify one or more recipients of the second electronic message based, at least in part, on one or more of the sender of the first electronic message or the one or more recipients of the first electronic message; and
transmit the second electronic message to the one or more recipients.

16. The system of claim 15, wherein identifying that the feedback was provided comprises receiving feedback data from one or more of a messaging client or the messaging service.

17. The system of claim 15, wherein the one or more processors are further operative to receive the message identifier created by the messaging service.

18. The system of claim 17, wherein the one or more processors are further operative to receive one or more of identification of the recipients of the first electronic message or a subject of the first electronic message.

19. The system of claim 15, wherein transmitting the second electronic message comprises instructing a messaging client via an application-programming interface to send the second electronic message to the one or more recipients of the second electronic message.

20. The system of claim 15, wherein identifying the one or more recipients of the second electronic message comprises determining recipients of the first electronic message that did not provide the feedback.

\* \* \* \* \*